United States Patent
Maron

[11] 3,728,930
[45] Apr. 24, 1973

[54] MUSIC TRAINING DEVICE

[76] Inventor: William Maron, 1235 Buchanan Drive, Santa Clara, Calif. 95051

[22] Filed: July 26, 1971

[21] Appl. No.: 166,062

[52] U.S. Cl.................................................84/471
[51] Int. Cl..............................................G09b 15/00
[58] Field of Search..............84/470–474, 477–483

[56] References Cited

UNITED STATES PATENTS

| 255,979 | 4/1882 | Hauschel | 84/470 |
| 2,497,364 | 2/1950 | Mayberry | 84/473 |

FOREIGN PATENTS OR APPLICATIONS

| 438,358 | 12/1926 | Germany | 84/471 |
| 39,349 | 7/1924 | Norway | 84/473 |
| 24,577 | 5/1921 | Finland | 84/470 |
| 136,874 | 12/1919 | Great Britain | 84/473 |

*Primary Examiner*—Stephen J. Tomsky
*Assistant Examiner*—John F. Gonzales
*Attorney*—Thomas E. Schatzel

[57] ABSTRACT

A music training device in the form of a slide member with a plurality of musical staves scored thereon in parallel relationship to one another; a means for forming a guide track in which the slide member may travel, the guide means further including at least one viewing window in the path of travel of the slide, whereby the staves on which notes are shown may pass said window responsive to movement of the slide.

4 Claims, 4 Drawing Figures

PATENTED APR 24 1973
3,728,930
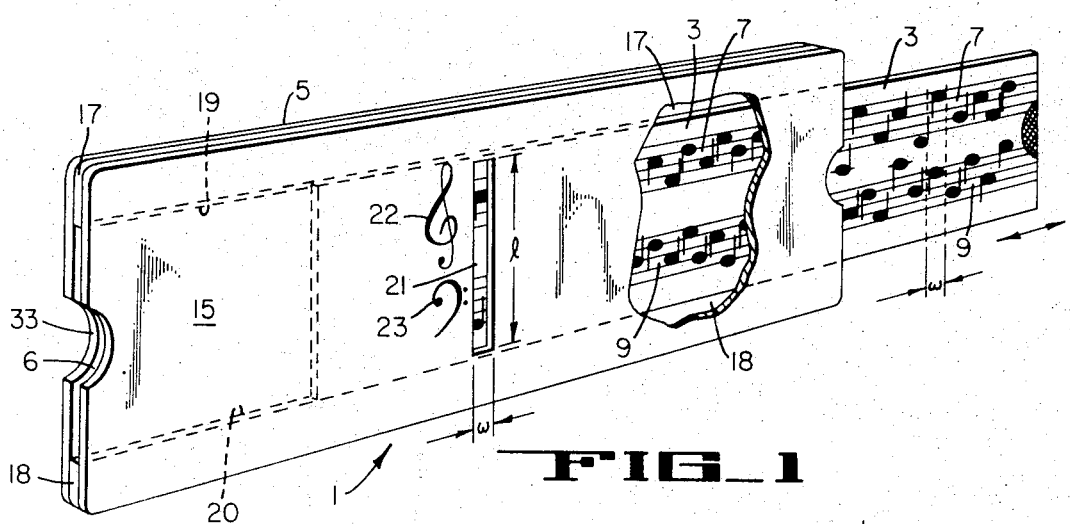
FIG_1
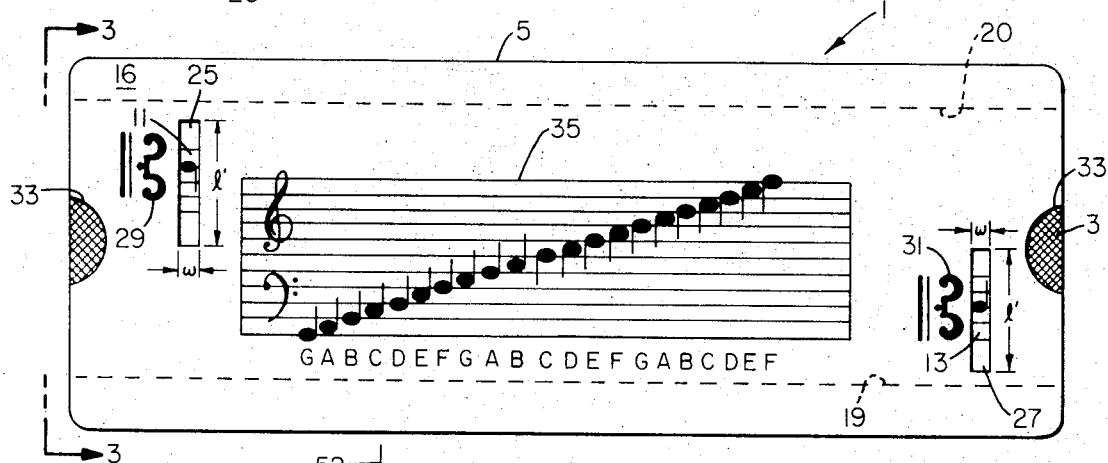
FIG_2
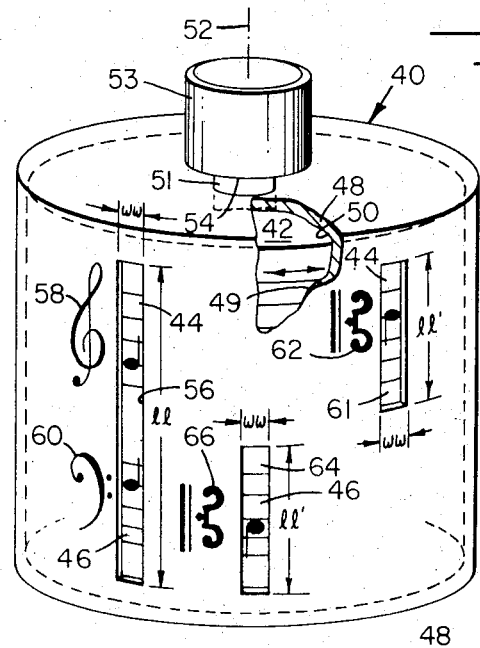
FIG_4
FIG_3
INVENTOR
WILLIAM MARON
BY Thomas Schatzel
ATTORNEY

MUSIC TRAINING DEVICE

BACKGROUND OF THE INVENTION

The present invention relates to a music training device and more particularly to a device to readily assist a student of music in rapidly learning the letter name of musical notes.

There is a widespread interest in music and a desire to learn to play musical instruments. Yet many people with a desire to play an instrument are intimidated by the degree of technical proficiency required. People appear especially intimidated at the thought of learning to sight read the various notes. Various approaches have heretofore been taken to provide teaching devices to aid the music student in learning the notes. These various devices have numerous inherent limitations including bulky size; necessity of a tutor or assistant to utilize the aid; complex structure; expensive; and are not adapted to simultaneously accommodate various instruments and voice.

SUMMARY OF THE PRESENT INVENTION

The present invention provides for an improved music training device. The device aid may be utilized by those students of instruments requiring the reading of music on one staff or by those students of instruments requiring the simultaneous reading of music on two staves, e.g., the piano. The device is further adapted to be controlled by the student for self teaching and at the rate of the students own progress.

An exemplary embodiment includes a slide member with a pair of musical staves each carrying a variety of spaced notes. A guide track means is included to guide the slide and a viewing window. The slide may be guided past the window. The window spans the two staves to permit the student to view the two staves simultaneously.

BRIEF DESCRIPTION OF THE DRAWINGS

FIG. 1 is a perspective view, with a segment broken away, of a teaching aid incorporating the present invention;

FIG. 2 is a back elevational view of the device of FIG. 1;

FIG. 3 is an end view of the device of FIG. 1; and

FIG. 4 is a perspective view of an alternative embodiment of the present invention.

DESCRIPTION OF PREFERRED EMBODIMENTS

FIGS. 1–3 illustrate a music teaching aid referred to by the general reference character 1 incorporating the teachings of the present invention. The aid 1 includes a two-faced planar slide 3 and a sleeve 5 for encompassing the slide 3. The sleeve 5 has an opening 6 extending horizontally through the sleeve and forming a track to permit the slide 3 to be slid end-to-end of the sleeve.

On one face, the slide 3 includes a staff 7 and a staff 9 extending parallel to one another over the horizontal length of the slide. On the other face, the slide 3 includes a staff 11 and a staff 13 extending parallel to one another over the horizontal length of the slide. Staves 7 and 11 are side-by-side and staves 9 and 13 are side-by-side. Each of the illustrated staves 7, 9, 11 and 13 includes five lines scored on the slide with a plurality of musical notes scored thereon. The notes are of various designations. They may be written at random or of a desired format to establish a select piece of music.

The sleeve 5 includes a front face section 15 and a back face section 16. Intermediate the faces 15 and 16 is a first spacer 17 and a second spacer 18. The spacers 17 and 18 are offset and positioned to form the rectangular opening 6. The spacer 17 forms a guide track 19 and the spacer 18 forms a guide track 20. The tracks 19 and 20 facilitate guiding the slide 3 past a rectangular viewing window 21. The window 21 extends longitudinally normal to the travel path of the slide 3. The width $w$ of the window 21 as illustrated is selected to span one vertical line of notes on the staves 7 and 9 of the slide 3. The length $l$ of the window 19 is selected to span two adjacent staves scored on the face of the slide. For example, as illustrated the window 21 spans staves 7 and 9. Adjacent to the window 21 and in alignment with the travel path of the staff 7 is a treble clef symbol 22 scored on the sleeve 5. Immediately beneath of the treble clef symbol 22 and in alignment with the travel path of the staff 9 is bass clef symbol 23. Accordingly, the music student desiring to learn to read notes and to simultaneously read the treble and base staves, as is necessary for the piano or organ, may slide the slide 3 past the window 21.

On the back face 16 of the sleeve 5 are a pair of viewing windows 25 and 27. Each of the windows 25 and 27 extend longitudinally normal to the travel path of the slide 3. The windows 25 and 27 are vertically and horizontally offset relative to one another. The window 25, as shown is in alignment with the staff 11 and the window 27 as shown is in alignment with the staff 13. The length of the windows 25 and 27 is each selected of a length $l$ to approximately coincide with or exceed with width of the associated staff scored on the slide. The width of the windows 25 and 27 are selected of the width $w$ to span one vertical line of notes of the associated staff. Adjacent to the window 25 and in alignment with the travel path of the staff 11 is scored a tenor clef symbol 29 and in alignment with the travel path of the staff 13 is scored an alto clef symbol 31.

Each end of the sleeve 5 carries an arcuate recess 33 to permit an individual to grasp the slide by his forefinger and thumb when he desires to operate the aid 1. The individual may manipulate the slide along the tracks 19 and 20 to vary the notes aligned within the viewing windows 21, 25 and 27. The rate at which the notes come into alignment with the windows is controlled by the individual himself. The windows, 21, 25 and 27 provide the individual with a choice dependent upon the type of instrument the individual is studying. The window 21 may be used by the organ or piano student, the window 25 by the violoncello student, and the window 27 by the viola student.

Scored on the face 16 intermediate the slots 25 and 27 is a reference great staff 35 indicating and identifying the various notes as they appear on the staff. Accordingly, a student may readily refer to the reference staff 35 to check his accuracy in reading notes appearing in any or all of the viewing windows 21, 25 or 27. For example, if a student is reading either window 25 or 27, the student may refer to the great staff by a movement of his eyes only. To check the notes on window 21 merely requires a flip of the aid 1 about its horizontal axis.

FIg. 4 depicts a partially sectioned view of an alternative embodiment of the present invention and referred to by the general reference character 40. The aid 40 includes a slide in the form of an interior cylinder 42 with a pair of staffs 44 and 46 scored thereon and extending the full circumference of the cylinder 42. A guide track, in the form of an exterior cylinder 48 encompasses the cylinder 42. The cylinder 48 has an internal side wall surface 49 and an interior top wall surface 50. The wall surface 49 is selected of a diameter to form a track and permit the cylinder 42 to be rotated relative thereto. The cylinder 48 has an aperture 51 coaxial with the axis of rotation 52 of the cylinders 42 and 48. Extending through said aperture 51 is a knob 53. The knob 53 is secured to said inner cylinder 42 by means of a shaft 54 coaxial with the axis 52. Accordingly, the inner cylinder 42 may be rotated responsive to turning of the knob 52 while the aid 40 is resting on a flat surface.

The outer cylinder 48 carries a viewing window 56 of a length $ll$ and a width $ww$ adapted to expose one vertical line of the two staves 44 and 46, simultaneously. Adjacent to the window 56 is a treble clef 58 and a bass clef 60 vertically positioned in alignment with each other and in alignment with the staffs 44 and 46, respectively. The cylinder 48 further carries a viewing window 61 with a tenor clef 62 adjacent thereto and in alignment with the staff 44. Another window 64 is provided with an alto clef 66 adjacent thereto and in alignment with the staff 46. The windows 61 and 64 are of a length $ll'$ and the width $ww$. The length $ll'$ is selected to exceed or equal the width of a staff. Accordingly, as the knob 53 and inner cylinder 42 are rotated, musical notes on the staves 44 and 46 align with the windows for viewing by the student. The outer surface of the cylinder 48 may be scored with a reference, e.g., a great staff.

Accordingly, the present invention provides a musical teaching device to aid a music student in learning the various musical notes. The device may be made of a desired size to permit the student to conveniently transport it in his pocket such that the aid will be readily available for his use when desired. At the same time alternative embodiments may be made of such size as to permit group teaching. The individual reading rate may be improved dependent upon the rate of which the slide is manipulated past the viewing windows.

I claim:

1. A musical training device, comprising:
   a first cylindrical member having an internal cavity for forming a guide track, said first cylindrical member having a first viewing window, a second viewing window and a third viewing window, said second and third viewing windows being offset vertically relative to one another;
   a second cylindrical member positioned within the first cylindrical member and forming a slide member adjacent said guide track, said slide member being movable along the guide track means relative to said first, second and third viewing windows and carrying a pair of musical staves positioned adjacent and parallel to one another, said staves extending about at least a segment of the circumferential surface of the second cylindrical member in substantial normal alignment to the viewing windows with said first viewing window spanning both of said musical staves and said second window being in substantial normal alignment with the path of travel of one of said musical staves and the third window being in substantial normal alignment with the path of travel of the other of said musical staves, and musical notes scored on said staves; and
   means for rotating said second cylindrical member relative to the first cylinder.

2. The musical training device of claim 1 in which the first viewing window is in substantial normal alignment with the path of travel of both of said musical staves and spans both of said staves.

3. A musical training device for improving an individual's speed in reading music for keyboard and string instruments, said device comprising, in combination:
   a two-faced planar slide member with a first and second staff positioned adjacent to one another horizontally on one face of the slide member, and a third and fourth staff positioned adjacent to one another horizontally on the other face of the slide member, said first and third staves being back-to-back relative to one another and said second and fourth staves being back-to-back relative to one another;
   guide track means including a planar sleeve forming a track extending longitudinally end-to-end of the sleeve and encompassing the planar slide member, the sleeve establishing a first and second face with only one viewing window in the first face and only two viewing windows in the second face of the sleeve, the viewing window in the first face of the sleeve being positioned in vertical alignment with and adjacent to the travel path of the two staves on one of said faces of the slide member, said window of the first face of the sleeve extending vertically relative to said staves and spanning the width of the two staves on one face simultaneously, a treble clef and a bass clef scored on the first face of the sleeve vertically adjacent to one another immediately adjacent to said first viewing window, the treble clef and bass clef each positioned in alignment with an associated staff of the slide; and the two viewing windows in the second face of the sleeve being vertically and laterally offset relative to one another and each positioned adjacent to and vertically spanning one of the two staves on the other of said faces of the slide, a tenor clef and an alto clef being positioned adjacent to one of said second viewing windows in alignment with one staff of the slide and the alto clef being positioned adjacent to the other of said second viewing windows in alignment with the other staff of the slide.

4. The musical training device of claim 3 in which each of said first, second and third windows is of a width to expose a maximum of one note per staff of the slide member.

* * * * *